United States Patent [19]

Murakami et al.

[11] 4,159,756
[45] Jul. 3, 1979

[54] ADJUSTING DEVICE FOR DAMPING FORCE OF REAR SHOCK-ABSORBERS OF MOTORCYCLES

[75] Inventors: Tomoharu Murakami, Kagamihara; Tadashi Jō, Kani, both of Japan

[73] Assignee: Kayaba K.K., Tokyo, Japan

[21] Appl. No.: 870,193

[22] Filed: Jan. 17, 1978

[51] Int. Cl.² ............................................. F16F 9/44
[52] U.S. Cl. .................................................. 188/319
[58] Field of Search ............... 188/278, 300, 285, 309, 188/310, 319

[56] References Cited

U.S. PATENT DOCUMENTS

| | | | |
|---|---|---|---|
| 2,394,355 | 2/1946 | Beecher | 188/319 X |
| 3,351,160 | 11/1967 | DeKoning et al. | 188/319 |
| 3,365,033 | 1/1968 | Willich | 188/319 |
| 3,937,307 | 2/1976 | de Kock | 188/319 |

*Primary Examiner*—Duane A. Reger
*Attorney, Agent, or Firm*—Saul Jecies

[57] ABSTRACT

The rear shock-absorber unit which suspends the rear wheel of motorcycles is provided with a device for adjusting the damping force produced by the hydraulic damper. The said adjusting device incorporates a passage which is provided in the piston rod so as to permit the fluid to flow throughout the upper and lower working chambers of the damper cylinder which are separated by the piston, and an adjusting member which is engaged, rotating freely, with the piston rod and covers one of the ports of the passage. The said adjusting member has a group of orifices, different in diameter, which connect successively to the said passage in the piston rod, and click stops which, at their respective positions, constrain the relative rotary motion between the adjusting member and piston rod. When the hydraulic damper reaches the extreme of expansion, it is pressed against a seal holder or stop rubber attached to the upper end of the damper cylinder to prevent the rotary motion. Thus, as the piston rod is rotated from the outside, the adjusting member and piston rod undergo a relative rotary displacement, and the orifice group of the adjusting member is selectively matched with the passage in the piston rod to change the damping force.

3 Claims, 4 Drawing Figures

ADJUSTING DEVICE FOR DAMPING FORCE OF REAR SHOCK-ABSORBERS OF MOTORCYCLES

BACKGROUND OF THE INVENTION

The present invention relates to a rear shock-absorber unit consisting of a hydraulic damper of the expansion cylinder type, provided with spring action, which suspends the rear wheel of motorcycles, and particularly to an adjusting device which adjusts the damping force from outside of the piston of the said hydraulic damper.

The rear shock-absorber unit provide with spring action, which suspends the rear wheel of motorcycles generally keeps stays at the position of its extreme expansion the suspension spring acting on the unit, before it is mounted on the motorcycle body when it is detached from the body. It is preferable, therefore, to adjust the damping force when it is at the extreme of expansion rather than when it is in compression.

A well-known adjusting device of such a kind is described in the specification of U.S. Pat. No. 3,937,307, granted to Cornelis de Kock, dated Feb. 10, 1976. The damping force adjusting device described in the specification consists of a ring-shaped valve which has an orifice leading to the opening of the piston and which is fixed firmly to it, a closure member which changes the said orifice opening area by relative rotary displacement with respect to this valve, an adjusting member which integrally connects to the closure member, and a stop member which is fitted to the end member of the cylinder so as to move in-and out freely. When the piston is moved to the extreme of expansion under the condition of the said stop member protruding into the cylinder, the said adjusting member is engaged with this stop member, and during the time when the piston is rotated by the piston rod, the rotation of the said closure member is prevented by the engagement of the adjusting member and stop member, and the valve rotating with the piston produces a relative rotary displacement with respect to the closure member to change the orifice opening area, thus, the damping force is adjusted.

In this well-known device, however, since the damping force adjustment is practiced in a manner such that, with the relative rotary displacement between a ring-shaped valve fixed firmly to the piston and a closing member fitted rotationally on the valve, the opening area of an orifice formed in the said valve is controlled, the damping characteristics which are changed are not only those at the low-speed range of the piston which depend solely on the orifice but also those at the medium and high speed range of the piston which depend on the valve, and this causes the defect that the desired damping characteristics can not be produced throughout the whole range of the piston speed. There is also another defect that, during the expansion stroke when the piston goes up, no damping characteristics which depend on the valve may be obtained. It may be added that, among the defects, there is also the fact that a special stop member is required only for the purpose of adjusting the damping force.

SUMMARY OF THE INVENTION

In view of above, the purpose of the present invention is to offer a damping force adjusting device for the rear shock-absorber unit for motorcycles which is free of such defects.

The rear shock-absorber unit for motorcycles to which the present invention applies, consists of a hydraulic damper and a spring element for suspension use. The said hydraulic damper has a damper cylinder which forms the outer shell and a piston which moves inside the cylinder. This piston separates the said damper cylinder into upper and lower working chambers, being moved by a piston rod. The damping force then produced is determined by the fluid resistance which is provided by a valve installed on the piston, which valve works, against the fluid flowing throughout the upper and lower working chambers.

In short, the present invention, which is based on the rear shock-absorber unit for motorcycles as abovementioned, has the following structural features. Namely, in the piston rod of the hydraulic damper, a passage is formed passing through the upper and lower working chambers in parallel to a valve attached to the said piston, and a port in this passage which opens to the upper operating chamber is covered with an adjusting member which is inserted, rotating freely, into the piston rod, being provided with a plurality of orifices which are different from each other in diameter, connecting successively with the said passage. The said adjusting member is pressed against a seal holder or stop rubber attached to the upper end of the damper cylinder when the hydraulic damper is in the position of the extreme expansion, and the rotation of the adjusting member is prevented when the piston is rotated by the piston rod. For this reason, the piston rod produces a rotary displacement relative to the adjusting member, so that the passage in the piston rod can connect with each orifice among the orifice group of the adjusting member. Thus, the damping force in the low speed range may be changed without causing any changes in the damping force in the medium and high speed ranges due to the valve installed in the said piston. In this case, in order to orient the passage of the piston rod correctly with respect to the orifices of the adjusting member, a click-stop mechanism is installed between the adjusting member and the piston rod.

The abovementioned and other purposes, characteristics and performances of the present invention may be comprehended more clearly by the following description of preferred embodiments with reference to the enclosed drawings.

DESCRIPTION OF PREFERRED EMBODIMENTS

Figure 1:
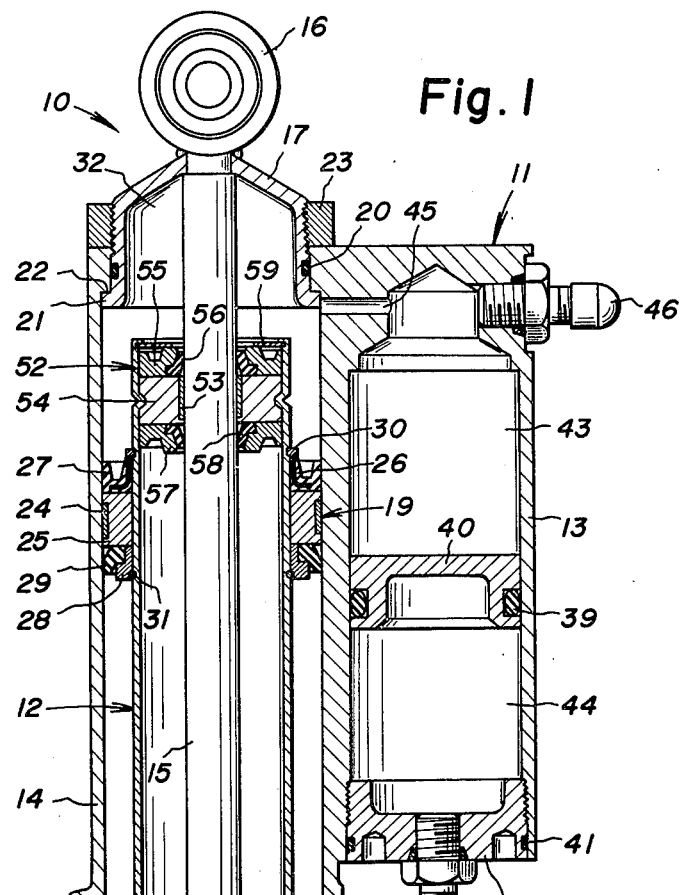
FIG. 1 represents a vertical-sectional front view of a rear shock-absorber unit for motorcycle use which is provided with an adjusting device according to the present invention.

In FIG. 1, a rear shock-absorber unit 10, which suspends the rear wheel of a motorcycle, consists of a gas spring 11 for suspension use and a hydraulic damper 12.

The body of the said gas spring 11 for suspension use is formed from a cylinder body 14 having a tank 13 on one side of it. Since the said cylinder body 14 also functions as a cover of the hydraulic damper 12, it is coupled with a connecting member 16 and cap 17 which are fitted to the upper end of the piston rod 15 in the hydraulic damper 12 by welding or other means, before it is mounted on the piston assembly 19, while sliding its inner wall in contact with the outer circumference of the said assembly, which is firmly attached to the upper outer circumference of damper cylinder 18.

Cap 17 has a seal 20 sealing the clearance against the inner wall of the cylinder body 14, and a flange 21 forming the outer circumference around the bottom. The cylinder body 14 is inserted until the step part 22 formed in the upper inner wall is brought into contact with and constrained by flange 21 of said cap 17, and is then integrally fixed to the cap 17, the sealing being achieved with ring nut 23 which is screwed around the outer circumference of cap 17.

The piston assembly 19 consists of a bearing 25 fitted with a piston ring 24 around its outer circumference, a gas seal 27 with a mandrel 26 laminated on to the upper part of this bearing 25, and a dust seal 29 fitted with a collar 28 around the lowest part of said bearing 25. The mandrel 26 of the gas seal 27 and the collar 28 of dust seal 29 are fastened with stop rings 30, 31 coupled around the outer circumference of damper cylinder 18. The piston assembly 19 is fixed firmly to the upper circumference of the damper cylinder 18 by means of these stop rings 30, 31, while isolating the first gas chamber 32 inside the cylinder body 14 by means of the gas seal 27.

A cap 33 is screwed into the bottom of the cylinder body 14, and the flange 34 of this cap 33 supports the lower end of a coil spring 35 which is incorporated between the cylinder body 14 and the damper cylinder 18. This coil spring 35 has a length such that its upper end can contact the collar 28 of the piston assembly 19 aforementioned just before the hydraulic damper 12 reaches the extreme of expansion, and functions to buffer the shock which is produced as the hydraulic damper 12 is expanded to its extreme. A stop 37 having a rubber stop 36 is fitted around the lower outer circumference of the damper cylinder 18, with a stop ring 38, and this rubber stop 36 contacts the cap 33 of the cylinder body 14 aforementioned just before the hydraulic damper 12 reaches the extreme of compression, so that the shock which is produced as the hydraulic damper 12 is compressed to the extreme can be buffered.

The tank 13 aforementioned which is provided on one side of the cylinder body 14 has a freely sliding piston 40 which is fitted with a seal 39 around its outer circumference, and the bottom of the tank 13 is sealed by screwing a ring nut 42 with a seal 41 attached around its outer circumference. While the said free piston 40 separates the inside of tank 13 into a second gas chamber 43 and third gas chamber 44, the second gas chamber 43 is connected to the first gas chamber 32 in the cylinder body 14 aforementioned by means of a through hole 45 bored in tank 13. The said first and second gas chambers 32, 43, are charged with relatively low pressure gases through an air charge valve 46 provided in tank 13, and the third gas chamber 44 is charged with gases having a higher pressure than those in the first and second air chambers 32, 43 through an air charge valve 47, which is provided with a ring nut 42 tightly closing the bottom of said tank 13. Before the hydraulic damper 12 starts compression work from the extreme of its expansion, the free piston 40 is pushed by the pressure of the third gas chamber 44 against the upper end inside tank 13 where it remains until the compression work reaches half-way, with only gases of the first and second chambers 32, 43 being compressed during this time. Then, when the gas pressure of the first and second gas chambers 32, 43 exceeds that of the third gas chamber 44, the free piston 40 starts to descend to compress the gas in the third gas chamber 44, so that the gas spring 11 for suspension use can provide the well-known two-stage gas spring characteristics.

Concerning hydraulic damper 12, a piston 49 with a piston ring 48 fitted around its outer circumference and a free piston 51 with a seal 50 fitted around its outer circumference are housed in the damper cylinder 18. The said piston 49 has a construction such that it may travel inside the damper cylinder 18 by means of its extension piston rod 15.

Piston rod 15 protrudes outside through an end member 52 which closes the upper end of the damper cylinder 18, and is fixed at the upper end to the connecting member 16 and cap 17 of the cylinder body 14 by welding or other means as aforementioned. The said end member 52 consists of a bearing 54 with a bushing 53 fitted into its sliding surface in contact with the piston rod 15, a gas seal 56 with a holder 55 laminated to the upper part of said bearing 54, and an oil seal 58 with a holder 57 installed under the same bearing 54. The bearing 54 is attached to the damper cylinder 18 with a roll calking, while a gas seal 56 is attached with a washer 59 on the upper end of its holder 55 and is fitted by bending the upper end of the damper cylinder 18 inward.

The free piston 51, in conjunction with the lower cap 60 which is fitted to the bottom of the damper cylinder 18 by welding or other means, separates a gas chamber 61 at the lower part inside the damper cylinder 18. Into this gas chamber 61 are charged gases from outside using a through hole 62 bored in the cap 60 and a ball 63 put in the gas chamber 61 beforehand. After that, the said through hole 62 is closed permanently by welding a connecting member 64 with the lower cap 60 or other means. The gas chamber 61 functions to compensate for the volume change equalling the volume of the piston rod 15 which moves in or out of the damper cylinder filled with the working fluid during the expansion or compression work of the hydraulic damper 12.

The said connecting member 64 works, in conjunction with the other connecting member 16 aforementioned, to mount the rear shock-absorber 10 between the motorcycle body and the rear wheel supporting member, which are not shown in the drawing. Thus, the rear shock-absorber unit 10 may not only support the rear wheel elastically against the motorcycle body due to the action of the gas spring 11 for suspension use, but also serve to dampen fast vibrations occurring between the rear wheel and the motorcycle body due to the action of hydraulic damper 12.

In order to cause the hydraulic cylinder 12 to produce damping force during its expansion or compression work, the piston 49 separates the remaining part inside the damper cylinder 18 into upper and lower working chambers 65, 66, both of which are connected with each other through the plurality of passages 67 bored in the piston 49. As can be seen clearly in FIG. 2, as long as the piston 49 is stopped, the upper end of the said passage 67 is connected to a ring-shaped opening 68, which is covered with a ring-shaped valve 69 made of an elastic material. (It is formed from a two-leaf valve in this preferred embodiment, but it may also be formed from one leaf from or from three or more leafs.) This valve 69 is centered on the piston rod 15 by means of a spacing ring 70 provided at the center.

On the spacing ring 70 are placed in successive layers ring-shaped center 71, support 72, leaf spring 73, valve stop 74 and spacer 75, which are clamped so as not to move in the axial direction between the piston 49 and the shoulder part 76 of the piston rod 15 by means of a nut 77 screwed into the lower end of the piston rod 15. Also, the valve 69 is fastened by the said center 71 to the upper surface side of the inner circumference end, and is pressed against the piston 49, being pushed by the leaf spring 73 at the upper surface side of the outer circumference end.

Again referring to FIG. 1, the valve 69 permits the working fluid in the upper working chamber 65 to flow into the lower working chamber 66 as the inner end side bends downward during the expansion work of the hydraulic damper 12, thus the expected damping force is produced on the expansion side in the medium and high speed range of the piston 49 utilizing the fluid resistance of the working fluid caused by the said valve 69. On the other hand, during the compression work of the hydraulic damper 12, valve 69 bends upward at its outer end to permit the working fluid to flow from the lower working chamber 66 toward the upper working chamber 65, so that the expected damping force can be produced on the compression side in the medium and high speed range of the piston 49.

Piston rod 15 has a passage 78 for the purpose of allowing the working fluid to flow in parallel to that flowing through the said valve 69. One of the ports of this passage 78 is open to the upper working chamber 65, while the other port is open to the lower working chamber 66. The port of passage 78 which is open to the said upper working chamber 65 is covered with a ring shaped adjusting member 79 inserted into the piston rod 15. This adjusting member 79 is clamped, rotating with respect to the piston rod 15 between a spring ring 80 attached to the piston rod 15 and the said spacer 75.

Figure 3:
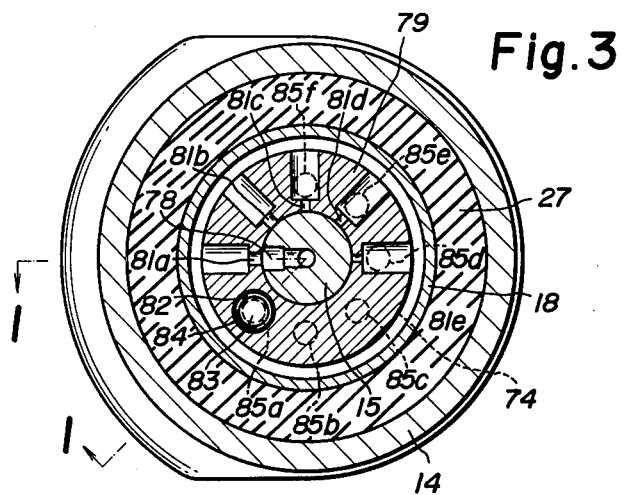
FIG. 3 represents a cross-sectional plan view along the 3—3 line of FIG. 2 abovementioned.

In this preferred embodiment, the adjusting member 79 is provided with five orifices 81a, 81b, 81c, 81d, 81e which are of successively smaller diameter with a separation angle of 45° as shown in FIG. 3. These orifices 81a ~ 81e can be connected selectively to passage 78 of the piston rod 15 depending on the relative rotary displacement of the piston rod 15 and adjusting member 79.

In order to close the said passage 78, or in order to match the respective orifices 81a ~ 81e selectively to this passage 78 in a correct position, a click stop mechanism is provided between the adjusting member 79 and the valve stop 74. In FIG. 1, the valve stop 74 and adjusting member 79 are shown in a sectional view along the 1—1 of FIG. 3 to clarify the operation of the click stop mechanism. This can be seen clearly in FIG. 1, with reference to FIGS. 2 and 3.

In the position of the adjusting member 79, shown in FIG. 1, orifice 81a is connected with the passage 78 of the piston rod 15. The adjusting member 79 has a ball 83 housed in the cavity 82, and this ball 83 is pushed downward at all times by a coil spring 84. In the condition of FIG. 1, the ball 83 is engaged with a concave despression 85a formed in the upper surface of the valve stopper 74. This condition is shown in FIGS. 2 and 3 which represent ordinary but enlarged vertical-sectional elevation and cross-sectional plan views, respectively.

As can be seen from FIG. 3, the valve stop 74 has concave depressions 85a, 85b, 85c, 85d, 85e, 85f, six in total and one more than the number of the orifices, 81a ~ 81e. These concave depressions 85a ~ 85f are positioned at an offset angle of 45° with respect to the corresponding orifices 81a ~ 81e so that these concave depressions 85a ~ 85e may engage with the ball 83 successively as the passage 78 is matched to the orifices 81a ~ 81e, and the concave depression 85f is also offset at the same angle of 45° with respect to the concave 85e. Therefore, the angle between concave depressions 85a and 85f is an angle of 135°, which is larger than the angle between any other of the concave depressions.

Figure 2:
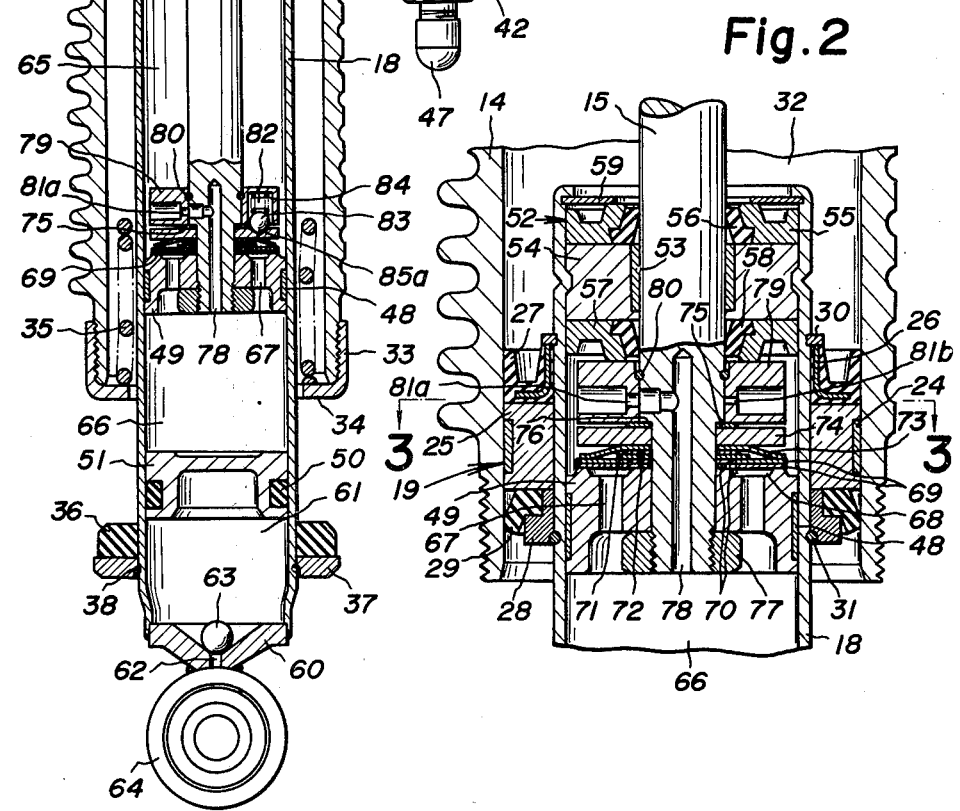
FIG. 2 represents a vertical-sectional front view of the essential part of the abovementioned adjusting device, which is placed in the adjusting position.

The selection among these orifices 81a ~ 81e for the passage 78 is carried out as follows: when cap 33 and coil spring 35 are removed from the cylinder body 14 as shown in FIG. 2, piston 49 is moved by the action of the gas spring 11 for suspension use to an end position such that the upper surface of the adjusting member 79 is pressed against the lower surface of the holder 57 of the oil seal 58. When the piston rod 15 rotates from this position to the right or left accompanied by the piston 49 and the member clamped between, adjusting member 79 keeps a stationary state due to the frictional force against the holder 57.

Now, therefore, when piston rod 15 rotates to the right from the position of FIG. 3, the concave depression 85a of the valve stop 74 departs from ball 83. After that, ball 83 is engaged in the next concavity 85b of the valve stop 74. This engagement may be sensed through piston rod 15. Passage 78 of the piston rod 15 which is connected to orifice 81a is then switched over to a connection with the orifice 81b. When the piston rod 15 is caused to rotate further to the right, then concavity 85c engages with ball 83, and the connection to passage 78 is switched over to orifice 81c. Subsequently, the switchover of the passage 78 to the orifices 81d, 81e is practiced in the same manner. Finally, when the piston rod 15 rotates to the right to the position where the concavity 85f is engaged with ball 83, passage 78 is closed completely by the adjusting member 79.

Thus, it can easily be seen that, with the piston rod 15 turning to the right, the orifice area connected to passage 78 reduces successively to zero in the end and that, with the piston rod 15 turning to the left, the opposite to the above takes place. Furthermore, since the angle between concavities 85a and 85f is larger than any angle between the concavities aforementioned, it is easy to locate this area which has a large blank space by turning the piston rod 15 to the right or left and by engaging concavity 85a or 85f with the ball 83 taking the said blank part as the location basis. Thus, the open position or closed position when the passage 78 is matched to the orifice 81a may be identified, and by counting the number of clicks from this position it also may be determined which of the orifices 81b ~ 81e is matched to passage 78.

In such a manner, this hydraulic damper 12 is capable of causing a damping force which depends only on the orifice characteristics of the piston 49 in the low speed range without the damping force of the piston 49 being affected in the medium and high speed range by the valve 69. After this adjustment, the upper connecting member 16 is readjusted to its normal direction by turning piston rod 15 while the hydraulic damper 12 is being compressed to a certain extent. Thus, adjusting member 79 which is then separated from holder 57 rotates together with piston rod 15, and the orifice area remains unchanged. Next, when the coil spring 35 and cap 33 are set to the lower end of the cylinder body 14, contact between the holder 57 and adjusting member 79 is blocked by coil spring 35 which is compressed between the collar 28 and the flange 34 of the cap 33.

Figure 4:
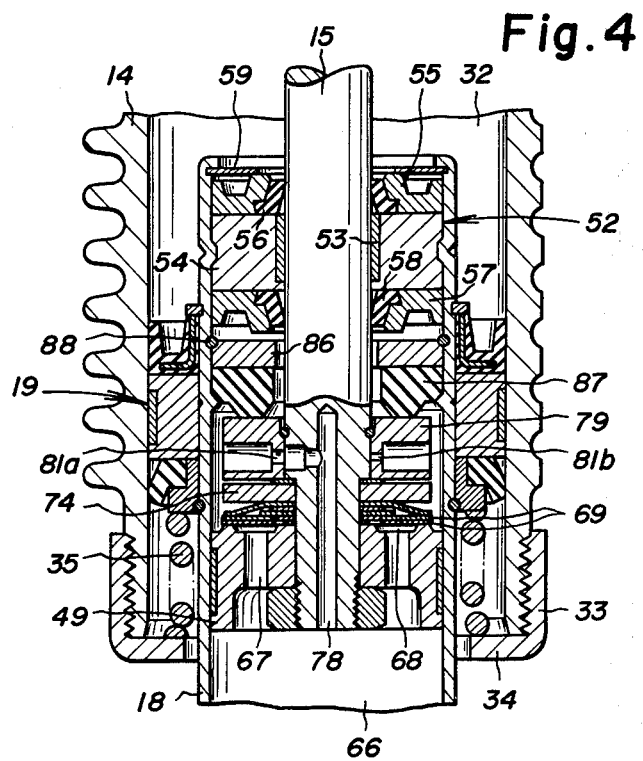
FIG. 4 represents a vertical-sectional front view of the essential part showing another preferred embodiment of the abovementioned adjusting device which is placed in the adjusting position.

In the case shown in the preferred embodiment of FIG. 4 where a rear shock-absorber is of a type that is provided with a retainer 86 and stop rubber 87 under the oil seal 58 by means of a stop ring 88 and roll calking for the purpose of absorbing the shock occurring when the hydraulic damper 12 reaches the extreme of expansion, the upper surface of the adjusting memer 79 is pressed against the said stop rubber 87 when the hydraulic damper 12 reaches the extreme of expansion, so that the selection of orifices may be achieved without removing cap 33 and coil spring 35 from the cylinder body 14.

Also, in the case where a suspension system using a coil spring instead of the gas spring is used in the rear shock absorber, it is clear that the present invention is applicable as it is.

Although the principles of the present invention are described above with reference to a given unit for illustrative convenience, it is quite natural that the present invention is not limited to the above.

What we claim is:

1. A damping force adjusting device for use in the rear shock-absorber of motorcycles, comprising
   a damper cylinder;
   a piston rod inserted from the outside and penetrating through an end member of said damper cylinder;
   a piston fixed to a lower end of said piston rod to separate said damper cylinder into upper and lower working chambers;
   a valve installed in the piston to determine the damping force in the medium and high speed range of the piston by providing resistance to the working fluid flowing throughout said upper and lower working chambers;
   a passage in the piston rod to connect the upper and lower working chambers in parallel to a flow passage of the working fluid through the valve;
   an adjusting member having a plurality of orifices, different in diameter, which are selectively connected to a port opening into the upper working chamber of said passage;
   said adjusting member being fitted rotationally to the piston rod;
   and a stop member which blocks the rotation of said adjusting member by frictional contact with it as the piston reaches the extreme of expansion.

2. A device as described in claim 1, said stop member represents a holder of an oil seal forming the end member of the damper cylinder.

3. A device as described in claim 1, wherein said stop member represents a stop rubber fitted to the upper part of the damper cylinder for the purpose of buffering the shock occurring when the piston reaches the extreme of expansion.

* * * * *